United States Patent [19]

Rall et al.

[11] Patent Number: 4,632,614
[45] Date of Patent: Dec. 30, 1986

[54] COMPOSITE TOOL UNIT FOR CHIP-REMOVING MACHINING

[75] Inventors: Gerhard Rall, Sommerhalde 72, D-7142 Marbach; Günther Hertel, Mörikestrasse 24; Karl G. Hertel, Kneippstrasse 12,, both of D-8500 Nürnberg; Hermann Kastner, Ludwigsburg, all of Fed. Rep. of Germany

[73] Assignee: Gerhard Rall, Marbach, Del.X ; by said Hermann Kastner

[21] Appl. No.: 527,257

[22] Filed: Jul. 29, 1983

[30] Foreign Application Priority Data

Jul. 30, 1982 [DE] Fed. Rep. of Germany ....... 3228521
Nov. 27, 1982 [DE] Fed. Rep. of Germany ....... 3243948
Mar. 19, 1983 [DE] Fed. Rep. of Germany ....... 3309922

[51] Int. Cl.4 .......................... B23B 29/12; B23C 5/26
[52] U.S. Cl. ........................................ 409/233; 82/37; 279/58
[58] Field of Search .......................... 409/233; 29/568; 82/1 R, 36 R, 36 A, 36 B, 37; 408/238, 239 R, 239 A; 279/17, 49, 54, 55, 58

[56] References Cited

U.S. PATENT DOCUMENTS

| 3,242,819 | 3/1966 | Erikson | 409/233 |
|---|---|---|---|
| 3,635,108 | 1/1972 | Prince | 82/1 R |
| 3,650,018 | 3/1972 | Perry et al. | 29/568 |
| 3,762,271 | 10/1973 | Poincenot | 409/233 |
| 3,851,364 | 12/1974 | Noa et al. | 29/568 |
| 3,868,886 | 3/1975 | Bondie | 409/233 |
| 3,889,962 | 6/1975 | Parsons | 279/46 |
| 3,975,984 | 8/1976 | Simmons | 409/233 |
| 4,135,418 | 1/1979 | McCray et al. | 82/36 A |
| 4,270,422 | 6/1981 | Andersson | 82/36 R |
| 4,334,811 | 6/1982 | Trumpf et al. | 409/233 |
| 4,406,195 | 9/1983 | Kruger et al. | 82/36 B |
| 4,580,472 | 4/1986 | Kastner | 409/233 |

FOREIGN PATENT DOCUMENTS

| 0010074 | 4/1980 | European Pat. Off. | 82/36 R |
|---|---|---|---|
| 0027282 | 4/1981 | European Pat. Off. | 409/233 |
| 1834308 | 8/1961 | Fed. Rep. of Germany | 82/37 |
| 1159733 | 12/1963 | Fed. Rep. of Germany | 82/36 B |
| 2234389 | 3/1979 | Fed. Rep. of Germany | 82/36 R |
| 2742759 | 4/1979 | Fed. Rep. of Germany | 82/36 R |
| 2706469 | 4/1979 | Fed. Rep. of Germany | 82/36 R |
| 8115135 | 5/1981 | Fed. Rep. of Germany | 82/36 R |
| 2106854 | 6/1981 | Fed. Rep. of Germany | 82/36 R |
| 3007440 | 9/1981 | Fed. Rep. of Germany | 82/36 R |

Primary Examiner—Gil Weidenfeld
Assistant Examiner—Glenn L. Webb
Attorney, Agent, or Firm—Spencer & Frank

[57] ABSTRACT

A composite tool unit comprising a tool shank, a tool head a chuck, a drawbar which is slidable in the longitudinal direction of the tool shank and a pulling shank which projects from the tool head. The drawbar and pulling shank are engaged around by the chuck, which is disposed in the tool shank axially to slide between an opening position and a closure position. The tool shank comprises an inner conical face which tapers in the direction of the drawbar and co-operates with outer conical segments disposed on the clamping jaws. The zones of the drawbar 8 and pulling shank 8 of the tool head engaged around by the chuck have respective projections. The flank of the radial projection of the drawbar which is remote from the tool head registers in each position of the clamping jaws with radially inwardly extending projections thereof to transmit an axial pull to the clamping jaws, whereas the projection of the pulling shank in relation to the clamping jaw projections registers only in the closure position of the chuck. The tool head is pulled via the drawbar, the chuck and the pulling shank into a positive connection (Hirth-type serrations) with the tool shank.

20 Claims, 5 Drawing Figures

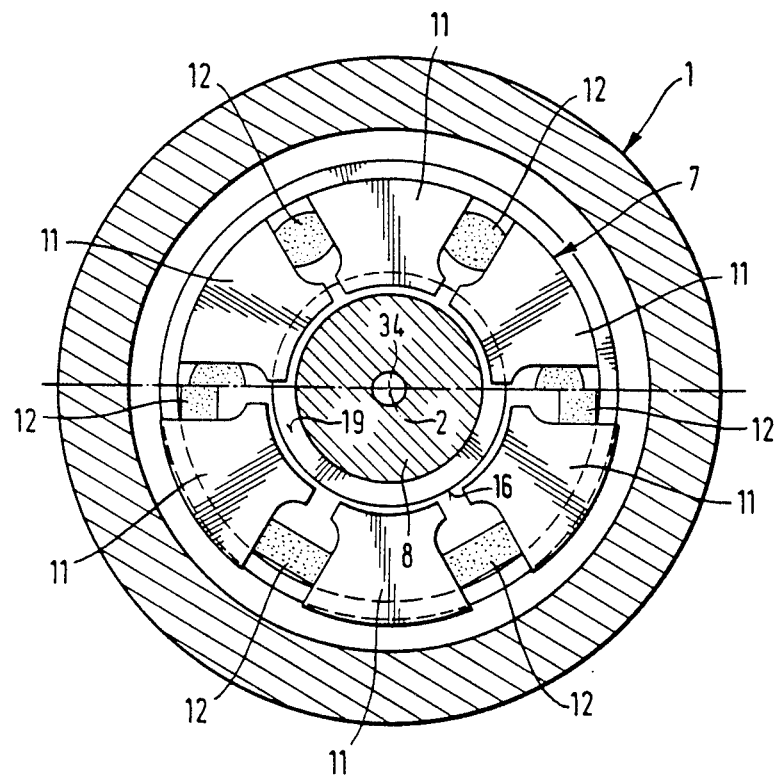

COMPOSITE TOOL UNIT FOR CHIP-REMOVING MACHINING

BACKGROUND OF THE INVENTION

This invention relates to a composite tool unit of the type known from European Patent No. A1-0010074.

In modern machine tools, in which the tool unit according to the invention is used, the tool cutting edges are subjected to very heavy stressing. This demands frequent changing of the cutting edge. Furthermore, to make such machine tools usable for all purposes, one tool must often be very quickly replaced by a differently designed one. It is therefore known to produce the tool in composite form, comprising a tool shank which is left on the machine, and a tool head which can be unturnably connected to the tool shank via a coupling, the tool head bearing the cutting edge.

The known tool unit of the kind specified has prismatic guide faces at the separating place between the tool shank and the tool head. The drawbar has a cylindrical pulling head which engages in a recess in the tool head which is open on a narrow side. The recess has a keyhole-like cross-section. In the case of that tool unit the tool head can only be connected to the tool shank when the latter is in a pre-determined turned position. The tool head and tool shank are connected and separated over a path of movement extending substantially at right angles to the longitudinal axis of the tool shank.

The invention relates to the problem of providing a composite tool unit of the kind specified whose tool head can be very simply and rapidly connected to the tool shank and again released therefrom and which in the connected position is highly nondeformable and stable, even in the face of cutting forces which change during the machining operation.

SUMMARY OF THE INVENTION

According to the invention the coupling is substantially of axially symmetrical construction. This has the advantage that in order to be connected to the tool shank, the tool head must not occupy any pre-determined turned position in relation to the tool shank. The pulling shank of the tool head is reliably seized by the chuck of the coupling in any turned position of the tool head. The tool head can be introduced by its pulling shank into the chuck of the tool shank over a rectilinear path of movement, such path of movement being aligned coaxially with the longitudinal axis of the chuck. The opening and closure movements of the chuck are performed by the longitudinal sliding of the drawbar. The drawbar is positively connected to the chuck, at least in the tightening direction, so that the chuck performs every tightening movement of the drawbar to the same extent.

The radially inward closure movement of the chuck is produced by co-operation between the outer conical face disposed on a portion of its outer periphery and a corresponding inner conical face of the recess in the tool shank. During its closure movement the chuck performs both an axial movement, corresponding to the longitudinal movement of the drawbar, and also a radially inward tongs-like movement, during which the clamping jaw projections of the chuck engage behind the radially outward extending projection of the pulling shank of the tool head and entrain the pulling shaft in the tightening direction of the drawbar. The chuck is opened by a movement of the drawbar in the direction of the tool head, during which the chuck is entrained. With this axial movement in the direction of the tool head the outer conical face of the chuck progressively ceases to be acted upon by the inner conical face of the tool shank. The tool head can then be very simply pulled off the tool shank in the axial direction, since due to the radially outward opening movement of the clamping jaws, the radially outward extending projection of the pulling shank can be moved out of registration with the inwardly directed clamping jaw projections.

The radially outward extending projection of the pulling shank is provided with a flank on the side remote from the drawbar having a conically shaped face which is acted upon by flanks on the clamping jaw projections of the chuck having the form of conical segments. The inner conical face of the recess in the tool shank exerts a centering force on the pulling shank which is superimposed on the axial pulling force exerted by the drawbar via the chuck on the pulling shank. As a result, the tool head obtains an additional radial clamping at a certain distance from the guide and bearing faces of the separating place from the tool shank. The rigidity of the connection between the tool head and tool shank is consequently enhanced.

By providing at least two axially spaced flanks having conically-shaped faces on the pulling shank and corresponding inner conical segmental faces on the clamping jaw projections of the chuck, the centering effect exerted on the pulling shank is distributed axially to several places. The same objective is obtained with regard to the radially inward directed forces exerted by the inner conical faces of the recess in the tool shank on the outer conical segments of the clamping jaws. These forces operate axially, distributed over several places on the clamping jaws, thereby ensuring that the chuck makes an even closure movement. Such an even closure movement is ensured if the clamping jaws of the chuck do not alter their parallel position in relation to the tool axis during the closure movement.

By providing at least two conical segments on the outer periphery of the chuck which close in the direction of the drawbar and corresponding conical faces on the inner peripheral wall of the tool shank recess, radially inward closure movement of the clamping jaws of the chuck is already completed before the drawbar and chuck respectively have completed their axial movement to reach the closure end position. On completion of the radially inward closure movement of the clamping jaws, the latter are reliably retained in a radial closure position, in large-area contact and with a relatively low surface pressure, by their cylinder segmental faces bearing against corresponding inner cylinder faces of the tool shank. As soon as the cylinder segmental faces of the clamping jaws are in contact with the inner cylinder faces of the recess in the tool shank, the wedging forces and the operative wedge angle thereof respectively, exerted by the chuck on the pulling shank during further tightening of the drawbar, are substantially reduced. Then the chuck exerts on the pulling shank of the tool head only the radially inwardly directed and therefore still centering wedging forces produced by the inner conical segmental faces of the clamping jaws. This enhances the clamping and positioning security of the composite tool unit according to the invention and also of its coupling, even under heavy, pulsating loading.

The relative positions of cylindrical segmental faces adjacent the conical segments on the outer periphery of the chuck are based on the following considerations: In the tool unit according to the invention the clamping jaws of the chuck bear both inside and outside against both the pulling shank of the tool head and the peripheral wall of the recess in the tool shank in the zone of two cones disposed one beside the other in the axial direction. This at least four-point or four-surface bearing at two reference parts (pulling shank, tool shank) means a static overdetermination which does not in itself ensure that the particular conical bearing faces bear supportingly against their corresponding matching faces.

A flush bearing of this kind is ensured in spite of the static overdetermination, since the bearing zones of the cones are so distributed over the longitudinal extent of the clamping jaws that the clamping jaws can resiliently bend slightly, due to the given leverage ratios, under the pulling force exerted by the drawbar, thereby ensuring the following effects: On the one hand, a flush multi-point bearing of the clamping jaws is ensured both in the zone of their inner conical segmental faces against the pulling shank and also of their outer conical segmental faces against the inner conical faces of the recess in the tool shank. Precisely when the chuck is in the tensioned condition this is of special importance for maintaining the positioning accuracy of the tool head under loading. Due to the axial position of the cones of the tool shank and of the pulling shank, the pull initiated by the drawbar subjects the individual clamping jaws to a pretensioning which ensures that the tool head is retained reliably and prestressed, bearing positively connected against the tool shank, even under extreme stressing due to load cycles.

In the zone of the tool-head-side inner and outer conical segmental faces of the chuck, the clamping jaws are wedged between the pulling shank of the tool head and the tool shank in a substantially common radial plane, while the other bearing zones of the clamping jaws against the pulling shank and the tool shank engage in different axial positions with the insides and outsides of the individual clamping jaws and chuck respectively, at any rate in the tensioning end position. As a result, the bending forces induced in the clamping jaws by the drawbar become operative in such a way that in these zones the clamping jaws can bend slightly and therefore automatically compensate the static indeterminations of the multi-zone bearing of the clamping jaws of the chuck against the tool shank and against the pulling shank of the tool head. The final result is therefore to ensure effective multiple positioning of the tool head over a considerable axial length inside the tool shank.

By providing inner projections on the clamping jaws which extend into the sliding path of the drawbar, it is ensured that the axial opening movement of the drawbar is associated with a corresponding axial movement of the chuck which enables its clamping jaws to move apart radially. By selecting the angle of the inner conical faces of the recess to avoid self-locking, ready opening and closure of the chuck is encouraged by its axial sliding inside the tool shank on the side of the drawbar.

The use of plane-notch serrations, such as the Hirth-type, in the end faces of the tool head and tool shank in the first place enables the tool head to occupy in practice any required turned position in relation to the tool shank at comparatively narrow angular distances, the coupling being operative in the same manner. Moreover, the Hirth-type serrations ensure the required resistance to turning of the connection between the tool head and the tool shank, by the positive interengagement of the serrations on both sides. Lastly, the Hirth-type serrations have the great advantage of producing automatic centering of the tool head in relation to the tool shank and its central longitudinal axis respectively when an axially pull is exerted on the pulling shank of the tool head. As a result the tool shank exerts on the tool head a further centering action which moreover operates at a substantially axial distance from the centering action exerted by the chuck on the pulling shank of the tool head. This gives the tool head a particularly high degree of positioning accuracy in relation to the tool shank.

The construction according to the invention enables at least one continuous bore to be provided which extends from the outside of the tool head, adjacent the tool cutting edge, to the machine-side end of the drawbar. The axis of the continuous bore can even coincide with the central longitudinal axis of the whole tool unit and can therefore operate completely independently of the particular turned position of the tool head in relation to the tool shank. The bore can be used for transmitting the beam of an optical or electro-optical measuring system which, for example, monitors the position and intactness of the tool cutting edge. Similarly, the bore can be used for conveying a coolant or lubricant. Several bores can also be provided for various purposes of that kind.

Due to the provision of an axial prolongation on the drawbar, the tool-head-side end of the drawbar slides axially inside a bore in the drawbar-side end of the pulling shank of the tool head and, in operation, a continuous bore extending through the drawbar and pulling shank remains free from disturbing outside influences. The interposition of a seal between the prolongation of the drawbar and the pulling shank results in friction which, for example, when the drawbar slides axially in the opening direction also transmits an axial movement to the pulling shank and therefore the tool head and encourages its release from the tool shank.

BRIEF DESCRIPTION OF THE DRAWINGS

The subject matter of the invention will be described in greater detail with reference to embodiments thereof shown in the drawings, wherein:

FIG. 5 is a cross-section, corresponding to the line V—V in FIG. 4, through the tool unit, with the chuck closed.

DESCRIPTION OF THE PREFERRED EMBODIMENTS

Figure 1:
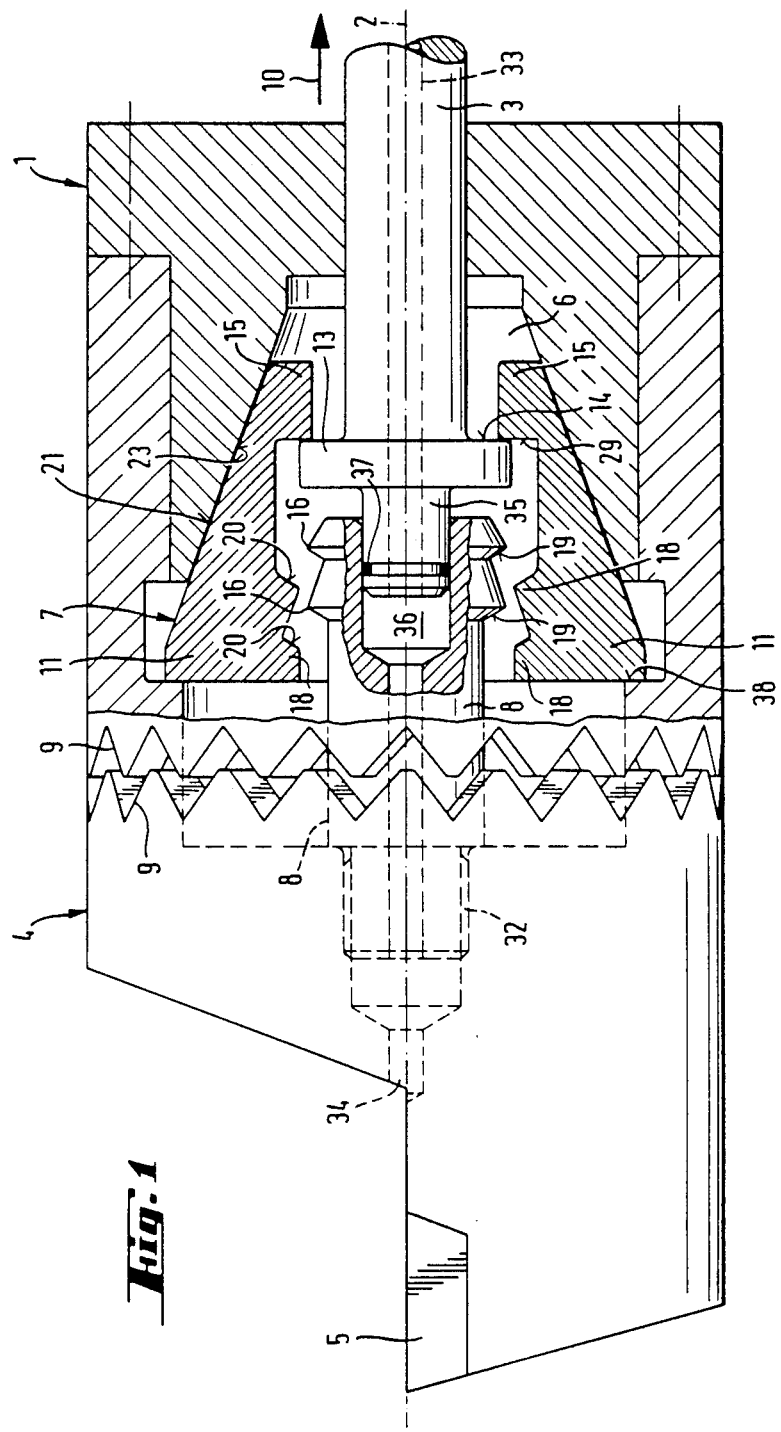
FIG. 1 is a vertical section through the front end of a first embodiment of a tool unit constructed according to the invention, with the chuck in the opening position.

The tool unit mainly comprises a tool shank 1, a drawbar 3 mounted to slide in the tool shank 1 in the longitudinal direction of the tool shank axis 2, a tool head 4, having attached to its front end, for example, a cutting member 5 of carbide metal, and a chuck 7 disposed in a front recess 6 in the tool shank 1. The drawbar 3 can be slid in the direction of the shank axis 2, between an opening position (FIG. 1) and a closure position (FIG. 2) of the chuck 7, by a drive, for example, a screw spindle or a hydraulic system (not shown in detail). The tool head 4 has a screwed-in pulling shank 8 which projects in the direction of the tool shank 1 and extends into the recess 6 in the tool shank 1. The tool head 4 can be positioned by the drawbar 3 via the chuck 7 and the pulling shank 8 in positive connection against the end face of the tool shank 1, each end face being formed in the embodiments illustrated by Hirth-type serrations 9. The Hirth-type serrations 9 on the one hand fix the tool head 4 in different turned positions in relation to the tool shank 1, and on the other hand exert a self-centering action when the drawbar 3 pulls in its tightening direction 10 the tool head 4 against the tool shank 1.

The chuck 7 comprises a number of clamping jaws 11 which extend parallel with one another in the direction of the shank axis 2 and engage around the drawbar 3 and the pulling shank 8. Disposed between each of the individual clamping jaws 11 is a spring element 12 (See FIG. 5) which is made of a rubber-elastic material and is connected laterally to the clamping jaws 11 by substance bonding, for example, by glueing or vulcanization, so that the clamping jaws 11 co-operate with the spring elements 12 to form a unit, namely the chuck 7 itself. The spring elements 12 automatically expand the clamping jaws 11 apart in the opening position of the chuck (FIG. 1), thereby so releasing the pulling shank 8 of the tool head 4 that the tool head 4 can be released from the tool shank 1 unimpeded in the axial direction oppositely to the tightening direction 10.

In its zone engaged around by the chuck 7 the drawbar 3 has an outwardly projecting, more particularly annular radial projection 13 whose flank 14 remote from the tool head 4 registers radially with inwardly extending drawbar-side projections 15 in both the opening and closure position of the chuck 7, in order to transmit an axial pull to the clamping jaws 11.

In its zone engaged around by the chuck, the pulling shank 8 of the tool head 4 has a radially outwardly extending, more particularly annular projection 16. The flank 17 of the projection 16 remote from the drawbar 3 registers radially with the inwardly extending pulling-shank side clamping jaw projections 18 in the closure position (FIG. 2) of the chuck 7, in order to transmit an axial pull to the tool head 4. In the opening position (FIG. 1) of the chuck 7, the flanks 17 do not register radially with the clamping jaw projections 18.

The flank 17 (FIG. 3) of the radial projection 16 of the pulling shank 8 remote from the drawbar 3 is an outer conical face (reference 19 in FIGS. 1, 2 and 4), which opens in the tightening direction 10 of the drawbar 3 and is acted upon by the conical segmental flanks 20 of the clamping jaw projections 18 (FIG. 3) in the closure position of the chuck 7.

Figure 2:
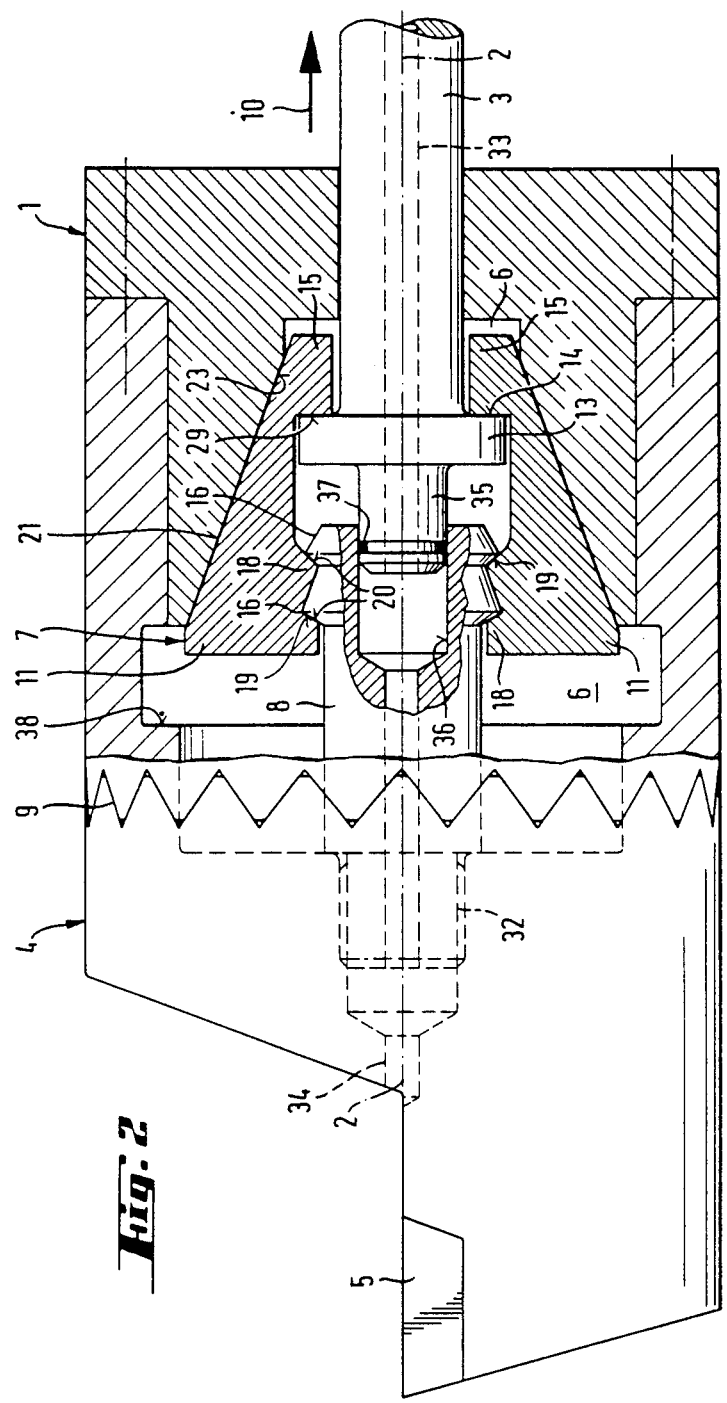
FIG. 2 shows the tool unit illustrated in FIG. 1, with the chuck in the closure position.
Figure 4:
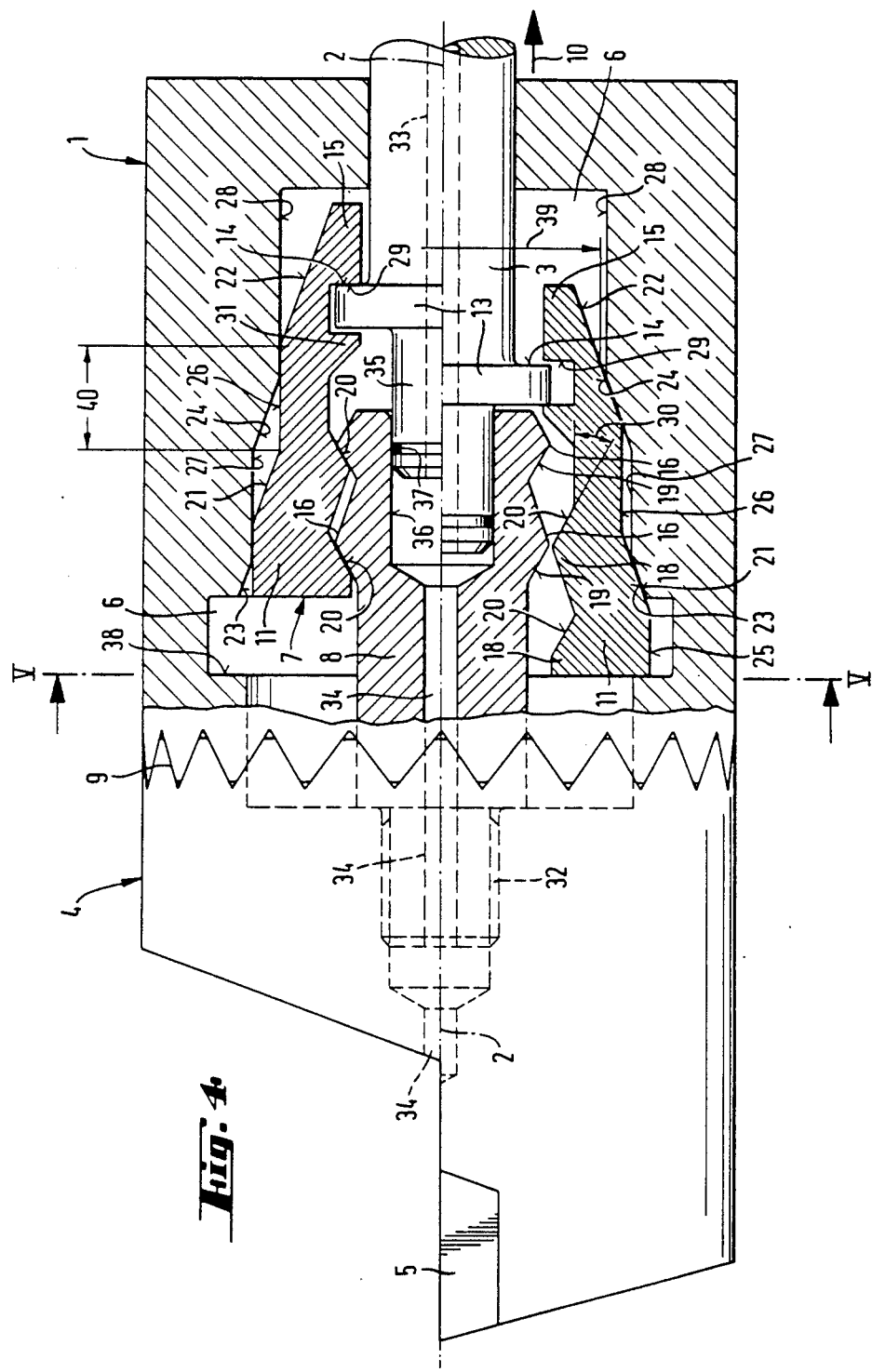
FIG. 4 is a vertical section through the front end of a third embodiment of the tool unit, whose chuck is shown in the tensioning position above the longitudinal axis and in the opening position below the longitudinal axis.

In the embodiments illustrated in FIGS. 1, 2 and 4 two outer conical faces 19 are disposed axially spaced out on the pulling shank 8. The clamping jaw projections 18 corresponding to the outer conical faces 19 take the form of inner conical segmental faces. The outer conical faces 19 of the pulling shank 8 have the same diameter.

Figure 3:
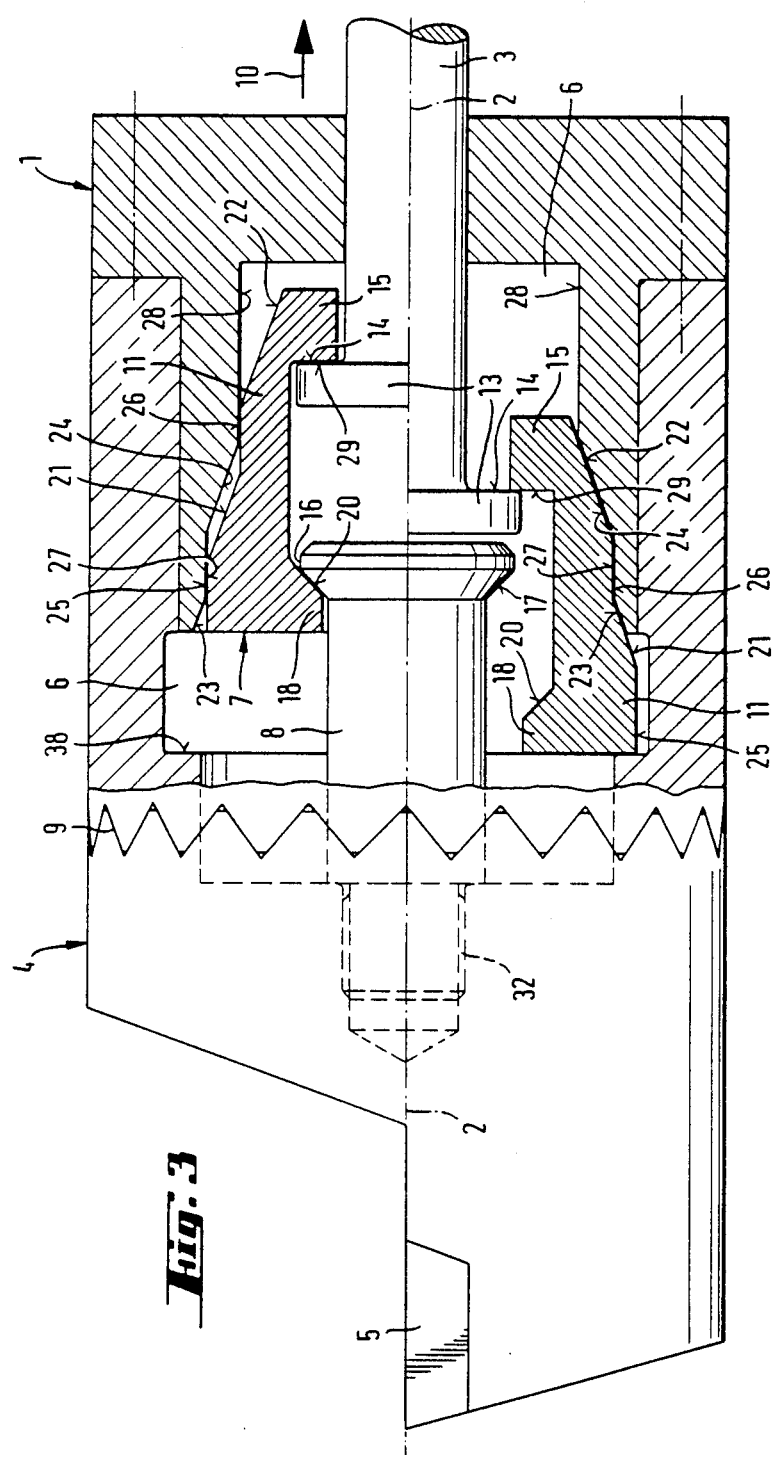
FIG. 3 is a vertical section through the front end of a second embodiment of the tool unit, whose chuck is shown in the tensioned position above the longitudinal axis and in the opening position below the longitudinal axis.

On the outer periphery of the chuck 7, the clamping jaws 11 have two outer conical segments 21,22, axially spaced out in the embodiments illustrated in FIGS. 3 and 4, which close in the tightening direction 10 of the drawbar 3. The peripheral wall of the recess 6 in the tool shank 1 has a number of inner conical faces 23, 24 co-operating with the outer conical segments 21,22 which correspond to the number of outer conical segments 21,22 of each clamping jaw 11.

The operative diameters of the axially spaced-out outer conical segments 21,22 of the clamping jaws 11 are so variously stepped in relation to one another that the operative diameter 39 of the drawbar-side outer conical segment 22 is smaller than the operative diameter of the tool-head-side outer conical segment 21, a cylinder segmental face 25 and 26 respectively adjoining each outer conical segment 21,22 in the direction of the tool head 4. Consequently, when the drawbar 3 is advanced in the direction of the tool head 4 and the chuck 7 is consequently opened, the clamping jaws 11 bear via their outer conical segments 21,22 against the corresponding inner conical faces 23,24 of the tool shank. In contrast, when the drawbar 3 is pulled in the tightening direction 10 (upper half of FIGS. 3 and 4) and the chuck 7 is consequently closed, the clamping jaws 11 bear via their cylinder segmental faces 25,26 against corresponding inner cylinder faces 27,28 of the tool shank 1.

In the embodiment illustrated in FIG. 4, those cylinder segmental faces 26 of the clamping jaws 11 which are remote from the tool head lie in the direction of the shank axis 2 with their axial length 40 centrally between the flanks 29 of the clamping jaw projections 15 against which the drawbar bears and the tool-shank-side inner conical faces 20 of the clamping jaws 11. Those cylinder segmental faces 25 of the clamping jaws 11 which are adjacent the tool head 4 lie in substantially the same radial plane as those flanks 20 of the clamping jaws 11 which are adjacent the tool head 4 and take the form of inner conical segmental faces. The flanks 20 taking the form of inner conical segmental faces enclose an angle 30 of about 30° with the tool shank axis 2. Disposed on the clamping jaws 11 are inner projections 31 extending into the sliding path of the radial projection 13 of the drawbar 3 in the direction of the tool head 4.

The pulling shank 8 is connected via a screwthreaded connection 32 to the other parts of the tool head 4.

At least one axially extending bore 33 and 34 respectively extends through the drawbar 3 and pulling shank 8. The bores 33,34 each form part of a connecting path between the tool cutting edge of the cutting member 5 of the tool head 4 and an auxiliary unit (not shown) disposed at the machine-side end of the drawbar 3. The bores 33,34 are in alignment with one another and are used either for the conduction of the beam of an optical or electro-measuring system or for conveying coolant or lubricant.

The tool-head-side end of the drawbar 3 is guided by means of an axial prolongation 35 to slide axially inside a bore 36 made in the drawbar-side end of the pulling shank 8 of the tool head 4. This guide between the drawbar 3 and the pulling shank 8 is fluid-tight. The seal between the prolongation 35 of the drawbar 3 and the pulling shank 8 is formed by a sealing ring 37 which engages around the prolongation 35 and is disposed in an annular groove.

At its tool-head-side end the tool shank 1 has an axially operative, more particularly circular travel-limiting stop 38 for the opening movement of the chuck 7.

In the embodiment illustrated in FIG. 4 the tool unit operates as follows: When the chuck is in the opening position (lower part of FIG. 4), the clamping jaws 11 are in the expanded, radially outer position. In this position the pulling shank 8 of the tool head 4 can freely enter the radial gap between the clamping jaws 11 or be pulled out of such gap in the direction of the axis 2. In this opening position of the chuck 7, their radially outer surfaces with the outer conical segments 21,22 bear against the corresponding inner conical faces 23,24 of the tool shaft 1.

If the chuck 7 is to be closed with the tool head 4 attached, for this purpose the drawbar 3 is pulled in the tightening direction 10. The outer conical segments 21,22 of the clamping jaws 11 of the chuck 7 first slide over the inner conical faces 23,24 of the tool shank 1, with the consequence that the clamping jaws 11 are displaced radially inwards. This means that the chuck closes. As the drawbar 3 is progressively tightened, the mutual bearing between the clamping jaws 11 and the tool shank 1 passes out of the conical zones on both sides into the cylindrical zones on both sides. Then the clamping jaws 11 slide via their cylinder segmental faces 25,26 over the corresponding inner cylindrical faces 27,28 of the tool shank 1. The radially inward movement of the clamping jaws 11 is completed. All that then takes place is an axial movement in the tightening direction 10 between the clamping jaws 11 and the tool shank 1.

As the drawbar 3 continues to be tightened in the tightening direction 10, those flanks 20 of the clamping jaws 11 which take the form of inner conical segmental faces are applied with increasing firmness against the corresponding outer conical faces 19 of the pulling shank 8 of the tool head 4. As a result, the tool head 4 with its Hirth-type serrations 9 is pulled even more strongly into the matching serrations of the end face of the tool shank 1. When the tool head 4 and the tool shank 1 are bearing against one another in positive connection, the clamping and wedging action exerted by the cone-like flanks 20 of the clamping jaws 11 becomes fully operative. The clamping jaws 11 are then clamped in a plane extending substantially perpendicularly through the tool shank axis 2 between the outer conical faces 19 of the pulling shank 8 and more particularly the tool-head-side inner cylindrical face 27 of the tool shank 1. As the chamber 3 continues to be tightened, the drawbar-side part of each clamping jaw 11 acts to some extent like a two-armed lever. The two lever arm ends are formed virtually by that flank 29 of the clamping jaw projection 15 against which the drawbar bears and that drawbar-side flank 20 of the clamping jaw 11 which takes the form of an inner conical segmental face, while to some extent the drawbar-side cylinder segmental face 26 of each clamping jaw 11 forms the abutment for such two-armed lever. Due to the free zone between the outer conical segment 22 and the inner cylindrical face 28 of the tool shank 1 formed by the drawbar-side outer conical segment 22, the drawbar-side lever arm of the theoretical two-armed lever can bend upwards (of course in the resilient zone), with the consequence that a radially inwardly directed pressure is additionally operative in the zone of the drawbar-side flank 20 of each clamping jaw 11. This is the case, although the clamping jaws 11 do not bear on the outside against the tool shank 1 at the level of their drawbar-side flanks, but there is in this case also a free zone, namely the zone between the outer conical segment 21 and the cylinder segmental face 26 on the one hand and the inner conical face 24 and the inner cylindrical face 27 on the other. This effect, after the fashion of a two-armed lever, results in even the drawbar-side outer conical face of the pulling shank being reliably acted upon, so that any negative consequences are overcome which are due to the static overdetermination by the presence of several bearing faces between the clamping jaws 11 and the tool shank 1 and pulling shank 8 respectively.

For the opening of the chuck, the drawbar 3 is repelled oppositely to the tightening direction 10. The radial projection 13 of the drawbar 3 impinges against the inner projection 31 of the clamping jaws 11, which it pushes out of their tensioning position in the direction of the tool head 4. The tool head 4 is also entrained by the sealing ring 37 via the pulling shank 8. As soon as the outer conical segments 21,22 of the clamping jaws 11 register with the inner conical faces 23, 24 of the tool shank 1, the chuck 7 opens under the pressure of the spring elements 12. The clamping jaws 11 move apart. As soon as the flanks 20 of the clamping jaws no longer register radially with the outer conical faces 19 of the pulling shank 8, the tool head 4 can be removed unimpeded from the tool shank 1.

We claim:

1. A composite tool unit, having opening and closure positions, for coupling a cutting member to a machine tool, comprising a tool shank having a longitudinal axis and a recess in the frontal face thereof, said recess including a peripheral wall with at least two axially spaced inner conical faces, the diameters of each of said inner conical faces being greatest at the ends thereof closest to the frontal face of said tool shank;

a drawbar, connectable to a power drive of said machine tool, mounted within said tool shank and displaceable along the longitudinal axis thereof, said drawbar having a first annular radial outwardly projecting projection at a portion thereof located within said recess;

a tool head for supporting said cutting member at one end, the other end of said tool head being longitudinally clampable against the frontal face of said tool shank, said tool head when clamped being centered about said longitudinal axis and non-rotatable with respect to said tool shank;

a pulling shank attached to said tool head and projecting therefrom for insertion in the recess of said tool shank, said pulling shank including axially spaced second annular radial outwardly projecting projections for positioning within said recess, each of said projections having an external conical face on the side of said second projection facing said tool head, the diameters of each of said external conical faces being greatest at the ends thereof furthest from the frontal face of said tool shank; and a chuck having a plurality of individual clamping jaws extending parallel to the longitudinal axis of said tool shank and coaxial with said drawbar, said clamping jaws being disposed within said recess surrounding the first annular radial projection on said drawbar and the second annular radial projection on said pulling shank when said pulling shank is inserted in said recess, said clamping jaws having a first set of radially inwardly projecting projections at the end of said recess adjacent said drawbar and a second set of axially spaced inwardly projecting projections at the end of said recess adjacent said pulling shank, each of said second set of projections on said clamping jaws having an internal conical face on the side thereof furthest from said tool head corresponding to the external conical faces on the projections on said pulling shank, the diameters of each of the internal conical faces on said clamping jaws being greatest at the end thereof furthest from the frontal face of said tool shank, said clamping jaws further having axially spaced outer conical segments corresponding to the inner conical faces on the peripheral wall of said recess, whereby, when said unit is in its opening position said clamping jaws are resiliently expanded to permit withdrawal of said pulling shank from said recess; and when said unit is moved from its opening to its closure position said drawbar is displaced in the axial direction away from said tool head so that said first outwardly projecting projection on said drawbar contacts said first set of inwardly projecting projections on said clamping jaws to translate said clamping jaws in the axial direction parallel to said longitudinal axis away from said tool head, and the axially spaced outer conical segments on said clamping jaws slide on the axially spaced inner conical faces on the peripheral wall of said recess to move said clamping jaws radially inward until in the closure position the second set of inwardly projecting projections on said clamping jaws contact the flanks of the second outwardly projecting projection on said pulling shank to clamp said tool head non-rotatably to the frontal face of said tool shank.

2. A composite tool unit according to claim 1, wherein the external conical faces of said pulling shank have the same diameter.

3. A composite tool unit according to claim 1, wherein the diameter of the axially spaced outer conical segments of said clamping jaw adjacent said drawbar is the smallest and that segment adjacent said tool head is the largest, an outer cylindrical segmental face extends from each of the conical segments on said clamping jaws in the direction toward said tool head and an inner cylindrical segmental face extends from each of the inner conical faces on the peripheral wall of said recess in the direction away from said tool head, whereby when said drawbar is translated toward said tool head to the opening position of said unit said outer conical segments of said clamping jaw bear against the corresponding inner conical faces on the peripheral wall of said recess, and when said drawbar is translated away from said tool head toward the closure position said outer cylindrical segments on said clamping jaw bear against the inner cylindrical segmental faces on the peripheral wall of said recess.

4. A composite tool unit according to claim 3, wherein the cylindrical segmental faces of said clamping jaws which are remote from said tool head lie in the axial direction between bearing flanks of said first projection on said drawbar and inner conical segmental faces on the second set of projections of said clamping jaws.

5. A composite tool unit according to claim 4, wherein the cylindrical segmental faces of said clamping jaws which are remote from said tool head lie centrally between said bearing flanks of said first projection on said drawbar and said inner conical segmental faces on the second set of projections of said clamping jaws.

6. A composite tool unit according to claim 4, wherein the cylindrical segmental faces of the clamping jaws adjacent the tool head lie in substantially the same radial plane as those inner conical segmental faces of the clamping jaws which are adjacent the tool head.

7. A composite tool unit according to claim 1, wherein inner conical segmental faces on the second set of projections of said clamping jaws enclose an angle of about 30° with the tool shank axis.

8. A composite tool unit according to claim 1, wherein a third set of inner projections are disposed on the clamping jaws and extend into the path of said drawbar as it is displaced along said longitudinal axis.

9. A composite tool unit according to claim 1, wherein the angle of the inner conical faces of the recess in said tool shank is not self-locking.

10. A composite tool unit according to claim 1, wherein said pulling shank is connected via a screwthreaded connection to said tool head.

11. A composite tool unit according to claim 1, wherein the end faces of said tool head and said tool shank which bear against one another are formed by plane-notch serrations.

12. A composite tool unit according to claim 1, wherein at least one bore extends axially through said drawbar and said pulling shank, said bore forming a connecting path between the cutting member of said tool head and an auxiliary unit disposed at one end of said tool head.

13. A composite tool unit according to claim 12, wherein an axial bore located within in said drawbar is in alignment with an axial bore provided within said pulling shank.

14. A composite tool unit according to claim 12, wherein said axial bores conduct the beam of an optical or electro-optical measuring system.

15. A tool unit according to claim 12, wherein said axial bores convey coolants or lubricants.

16. A composite tool unit according to claim 12, wherein said pulling shank has an internal bore therein, and wherein said drawbar is provided with an axial prolongation extending axially beyond the first projection thereon, said prolongation sliding axially inside the internal bore of said pulling shank.

17. A composite tool unit according to claim 16, wherein a seal is provided to render the space between the prolongation of said drawbar and said pulling shank fluid-tight.

18. A composite tool unit according to claim 17, wherein said seal between the prolongation of said drawbar and said pulling shank is formed by a sealing ring which encloses the prolongation and is disposed in an annular groove.

19. A composite tool unit according to claim 1, wherein said tool shank is further provided with a circular travel-limiting stop at the recess end thereof, said stop limiting axial displacement of said chuck when said unit is being moved to its opening position.

20. A composite tool unit according to claim 1, wherein spring elements are further provided between said clamping jaws for the resilient expansion thereof, said spring elements comprising intermediate webs of a compressible rubber-elastic material rigidly connected to both sides of adjacent clamping jaws.

* * * * *

UNITED STATES PATENT AND TRADEMARK OFFICE
CERTIFICATE OF CORRECTION

PATENT NO. : 4,632,614

DATED : December 30th, 1986

INVENTOR(S) : Gerhard RALL et al

It is certified that error appears in the above-identified patent and that said Letters Patent is hereby corrected as shown below:

Change "[73] Assignee: Gerhard Rall, Marbach, Del.X; by said Hermann Kastner" to -- [73] Assignee: Said Hermann Kastner has assigned his interest to said Gerhard Rall --.

Signed and Sealed this

Thirty-first Day of March, 1987

Attest:

DONALD J. QUIGG

Attesting Officer  Commissioner of Patents and Trademarks